United States Patent
Bloomquist, III et al.

(10) Patent No.: US 12,527,329 B2
(45) Date of Patent: Jan. 20, 2026

(54) COMPOSITIONS AND METHODS RELATING TO INSECTICIDES

(71) Applicant: University of Florida Research Foundation, Inc., Gainesville, FL (US)

(72) Inventors: Jeffrey R. Bloomquist, III, Micanopy, FL (US); Edmund Norris, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 991 days.

(21) Appl. No.: 17/442,853

(22) PCT Filed: Mar. 26, 2020

(86) PCT No.: PCT/US2020/024826
§ 371 (c)(1),
(2) Date: Sep. 24, 2021

(87) PCT Pub. No.: WO2020/198414
PCT Pub. Date: Oct. 1, 2020

(65) Prior Publication Data
US 2022/0174963 A1    Jun. 9, 2022

Related U.S. Application Data

(60) Provisional application No. 62/823,796, filed on Mar. 26, 2019.

(51) Int. Cl.
*A01N 65/06* (2009.01)
*A01N 43/50* (2006.01)
(Continued)

(52) U.S. Cl.
CPC ............. *A01N 65/06* (2013.01); *A01N 43/50* (2013.01); *A01N 43/56* (2013.01); *A01N 43/78* (2013.01);
(Continued)

(58) Field of Classification Search
CPC ................................ A01N 43/78; A01N 65/06
See application file for complete search history.

(56) References Cited

U.S. PATENT DOCUMENTS

| 3,186,903 A | 6/1965 | Soltes |
| 2009/0093500 A1* | 4/2009 | Benko ................... A01N 43/40 705/500 |

(Continued)

FOREIGN PATENT DOCUMENTS

KR      10-1898954 B1      9/2018

OTHER PUBLICATIONS

Yazdgerdian et al., Insecticidal effects of essential oils against woolly beech aphid, *Phyllaphis fagi* (Hemiptera: Aphididae) and rice weevil, *Sitophilus oryzae* (Coleoptera: Curculionidae), Journal of Entomology and Zoology Studies, 3(3), pp. 265-271 (Year: 2015).*

(Continued)

*Primary Examiner* — Carlos A Azpuru
*Assistant Examiner* — Casey S Hagopian
(74) *Attorney, Agent, or Firm* — Thomas|Horstemeyer, LLP

(57) ABSTRACT

Described herein are compositions, methods, and kits relating to insecticides. In additional embodiments according to the present disclosure, kits comprising administration devices and methods of such are also described. In embodiments according to the present disclosure, compositions and methods are described herein that comprise essential oils or
(Continued)

plant essential oils, for example fir oil or fir needle oil, as a synergistic insecticide additive.

10 Claims, 9 Drawing Sheets

(51) Int. Cl.
| | |
|---|---|
| *A01N 43/56* | (2006.01) |
| *A01N 43/78* | (2006.01) |
| *A01N 43/88* | (2006.01) |
| *A01N 53/00* | (2006.01) |
| *A01N 57/12* | (2006.01) |
| *A01P 7/04* | (2006.01) |

(52) U.S. Cl.
CPC ............ *A01N 43/88* (2013.01); *A01N 53/00* (2013.01); *A01N 57/12* (2013.01); *A01P 7/04* (2021.08)

(56) References Cited

U.S. PATENT DOCUMENTS

| | | | |
|---|---|---|---|
| 2012/0164081 A1 | 6/2012 | De Lame et al. | |
| 2014/0377385 A1* | 12/2014 | Enan ................. | A01N 65/08 424/764 |

OTHER PUBLICATIONS

Uneme et al., "Discovery and Development of a Novel Insecticide 'Clothianidin'", Sumitomo Kagaku (English Edition), 2006—II, Report 3, Sumitomo Chemcial Co., Ltd. (Year: 2006).*

"Grand Fir Essential Oil", Mountain Rose Herbs, https://www.https://mountainroseherbs.com/grand-fir-essential-oil, accessed Sep. 21, 2024 (Year: 2024).*

"Giant Fir Organic", Florihana, https://www.https://www.florihana.com/us/essential-oils/367-giant-fir-organic.html?srsltid=AfmBOoqOqROGRnyRr0AHiT-Qb_EwDU8hb28hhvLdekUqq3gwRJ70fTCx, accessed Sep. 21, 2024 (Year: 2024).*

Bi JL, "Seasonal population dynamics of the greenhouse whitefly *Trialeurodes vaporariorum* (Homoptera: Aleyrodidae) on strawberries in Southern California". J Econ Entomol. Dec. 2002;95(6):1179-84. doi: 10.1603/0022-0493-95.6.1179. PMID: 12539829.

Karamaouna F, "Insecticidal activity of plant essential oils against the vine mealybug, *Planococcus ficus*",. J Insect Sci. 2013;13:142. doi: 10.1673/031.013.14201. PMID: 24766523; PMCID: PMC4015406.

Choi WI, ,"Toxicity of plant essential oils to Trialeurodes vaporariorum (Homoptera: Aleyrodidae)",. J Econ Entomol. Oct. 2003;96(5):1479-84. doi: 10.1603/0022-0493-96.5.1479. PMID: 14650521.

Pavela, Roman. "Insecticidal activity of some essential oils against larvae of Spodoptera littoralis." Fitoterapia vol. 76,7-8 (2005): 691-6. doi: 10.1016/j.fitote.2005.06.001.

Ayşegül Karci et al., "Ovicidal activity of various essential oils against Confused Flour Beetle, *Tribolium confusum* Jacquelin duVal (Coleoptera:Tenebrionidae)", Integrated Protection of Stored Products IOBC/wprs Bulletin vol. 30 (2) 2007, 10 pages.

Johnson M. et a;, "Effect of Trialeurodes vaporariorum (Homoptera: Aleyrodidae) on Yield of Fresh Market Tomatoes", Article in Journal of Economic Entomology • Dec. 1992, DOI: 10.1093/jee/85.6.2370, pp. 2369-2376.

International Search Report for International Application No. PCT/US2020/024826, mailed May 26, 2020.

* cited by examiner

COMPOSITIONS AND METHODS RELATING TO INSECTICIDES

CROSS-REFERENCE TO RELATED APPLICATION

This application is the 35 U.S.C. § 371 national stage entry of PCT application No. PCT/US2020/024826, entitled "COMPOSITIONS AND METHODS RELATING TO INSECTICIDES" and filed Mar. 26, 2020, where the PCT claims priority to U.S. provisional patent application entitled "COMPOSITIONS AND METHODS RELATING TO INSECTICIDES", having Ser. No. 62/823,796, filed on Mar. 26, 2019, both of which are incorporated herein by reference in their entireties.

FEDERAL SPONSORSHIP

This invention was made with government support under CK000510 awarded by The Centers for Disease Control and Prevention. The government has certain rights in the invention.

BACKGROUND

More effective insecticidal formulations are needed, especially in the public health arena. Insecticide resistance is increasing over time, prompting the need for novel insecticide formulations that can effectively knockdown and/or kill inserts of interest. Furthermore, a need exists for insecticide formulations with no or low toxicity to humans. Accordingly, there is a need to address the aforementioned deficiencies and inadequacies.

SUMMARY

In aspects of the present disclosure, described herein are insecticide compositions. Insecticide compositions as described herein can comprise an essential oil. The essential oil can be a plant essential oil. In an embodiment, the essential oil is fir needle oil.

Insecticide compositions as described herein can further comprise a carrier. In an embodiment, the carrier is ethanol.

Insecticide compositions as described herein can comprise an insecticide.

In embodiments, the insecticide is one or more of an acetylcholinesterase (AChE) inhibitor; a gamma-Aminobutyric acid (GABA)-gated chloride channel blocker; a sodium channel modulator; a nicotinic acetylcholine receptor (nAChR) competitive modulator; a nicotinic acetylcholine (nAChR) allosteric modulator—site I; a juvenile hormone mimic; an alkyl halide; a borate; a methyl isothiocyanate generator; a chordotonal organ transient receptor potential channel (vanilloid) (TRPV) channel modulator; a mite growth inhibitor affecting chitin synthase 1 (CHS1); a microbial disruptor of insect midgut membranes; an inhibitor of mitochondrial ATP synthase; an uncoupler of oxidative phosphorylation via disruption of the proton gradient; a nicotinic acetylcholine receptor (nAChR) channel blocker; an inhibitor of chitin biosynthiesis affecting CHS1; an inhibitor of chitin biosynthesis type 1; an ecdysone receptor agonist; an octopamine receptor agonist; a mitochondrial complex III electron transport inhibitor; a mitochondrial complex I electron transport inhibitor; a voltage-dependent sodium channel blocker; an inhibitor of acetyl CoA carboxylase; a mitochondrial complex IV electron transport inhibitor; a mitochondrial complex II electron transport inhibitor; a ryanodine receptor modulator; a chordotonal organ modulator; a GABA-gated chloride channel allosteric modulator; a baculovirus; a nicotinic acetylcholine receptor (nAChR) allosteric modulator—site II; azadirachtin; benzoximate; bromopropylate; chinomethionat; dicofol; lime sulfur; mancozeb; pyridalyl; sulfur; *Burkholderia* spp; *Wolbachia pipientis* (Zap); *Chenopodium ambrosioides* nearambrosioides extract; fatty acid monoesters with glycerol or propanediol Neem oil; fungal agents (for example *Beauveria bassiana* strains, Metarhizium anisopliae strain F52, or *Paecilomyces fumosoroseus* Apopka strain 97); diatomaceous earth; veratrine; Sabadilla; paraffin oil; cottonseed oil; or a form of *Bacillus thuringiensis*.

In embodiments, the insecticide is one or more of a carbamate, organochloride, organophosphate, pyrethroid, neonicotinoid, sulfoximine, butenolide, mesoionic, spinosyn, avermectin, milbemycin, pyridine azomethines, pyropene, phenylpyrazole, oxidiazine, semicarbazone, tetronic and tetramic acid, flonicamid, diamide, isoxazoline, azadiractin, pyridalyl, beta-ketonitrile, carboxanilide, ryanoid, mite growth inhibitors, clofentazine, diflovidazin, hexythiazox, etoxazole, buprofezin, cyromazine, amitraz, diacylhydrazine, pyrrole respiration uncouplers, electron transport inhibitors, hydramethylnon, acequinocyl, fluacrypyrim, bifenazate, or METI acaricide.

In embodiments, the insecticide is from the organochloride, organophosphate, pyrethroid, neonicotinoid, diamide, ryanoid, phenylpyrazole class of insecticides The insecticide can be clothianidin. The insecticide can be naled. The insecticide can comprise natural pyrethrins, permethrin, or deltamethrin, individually or in combination. The insecticide can be natural pyrethrins. The insecticide can be permethrin. The insecticide can be deltamethrin. The insecticide can be fipronil. The insecticide can be imidacloprid. The insecticide can be thiamethoxam.

In embodiments, the insecticide composition can comprise about 1% to about 99% of essential oil. In embodiments, the insecticide composition can comprise about 1% to about 50% of essential oil. In embodiments, the insecticide composition comprises about 1% to about 10% of essential oil. In certain aspects, the insecticide composition comprises about 1% essential oil. In certain aspects, the insecticide composition comprises about 5% of essential oil.

In embodiments, the insecticide composition comprises an amount of essential oil effective to induce knockdown or mortality of a pest by 50% or more. In embodiments, the insecticide composition comprises an amount of essential oil and insecticide effective to induce knockdown or mortality of a pest by 50%.

In embodiments, the pest is an arthropod. In embodiments, the arthropod is selected form the group consisting of mosquitos, ticks, fleas, ants, corn borers, grain borers, beetles, flies, and cockroaches In embodiments, the arthropod is selected from the group consisting of blood-sucking insects, biting insects, cockroaches, mosquitoes, mites, blackfly, fleas, house flies, barn fly, face fly, bush fly, deer fly, horse fly, gnats, beetle, beer bug, louse, bed bug, earwig, ant, aphid, spruce bud worm, corn borer, sand flea, tsetse fly, assassin bug, biting flies, sand fly, stored grain pests, clothes moths, ticks, mites, spiders, phytophagous pests, and hematophagous pests.

In embodiments the arthropod or pest is a mosquito. In embodiments, the arthropod or pest is of the species *Aedes aegypti* or *Anopheles gambiae*

In embodiments according to the present disclosure, insecticide compositions as described herein further comprise piperonyl butoxide (PBO).

Also described herein are methods of knocking down or inducing mortality of an insect or pest. Methods of knocking down or inducing mortality of an insect or pest comprise administering an insecticide composition as described herein to an environment in need thereof, the environment in need thereof comprising a pest or at risk for introduction of one or more pests. In embodiments of methods according to the present disclosure, the insecticide composition is administered in an amount effective to induce knockdown or mortality by 50%. In embodiments of methods of the present disclosure, the pest is an arthropod. In embodiments of methods of the present disclosure, the arthropod is selected form the group consisting of mosquitos, ticks, fleas, ants, corn borers, grain borers, beetles, flies, and cockroaches. In embodiments of methods of the present disclosure, the arthropod is selected from the group consisting of blood-sucking insects, biting insects, cockroaches, mosquitoes, mites, blackfly, fleas, house flies, barn fly, face fly, bush fly, deer fly, horse fly, gnats, beetle, beer bug, louse, bed bug, earwig, ant, aphid, spruce bud worm, corn borer, sand flea, tsetse fly, assassin bug, biting flies, sand fly, stored grain pests, clothes moths, ticks, mites, spiders, phytophagous pests, and hematophagous pests. In embodiments of the present disclosure, the arthropod is a mosquito. In embodiments of the present disclosure, the arthropod is of the species *Aedes aegypti* or *Anopheles gambiae*

Also described herein are insecticide kits or systems. In embodiments, insecticide kits or systems comprise an insecticide composition as described herein and an applicator. In embodiments, the applicator is an aerosol spray can, a pump-spray bottle, a package for pharmaceutical cream, a fogger can, a bait station, or a syringe for injection.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DETAILED DESCRIPTION

Figure 1:
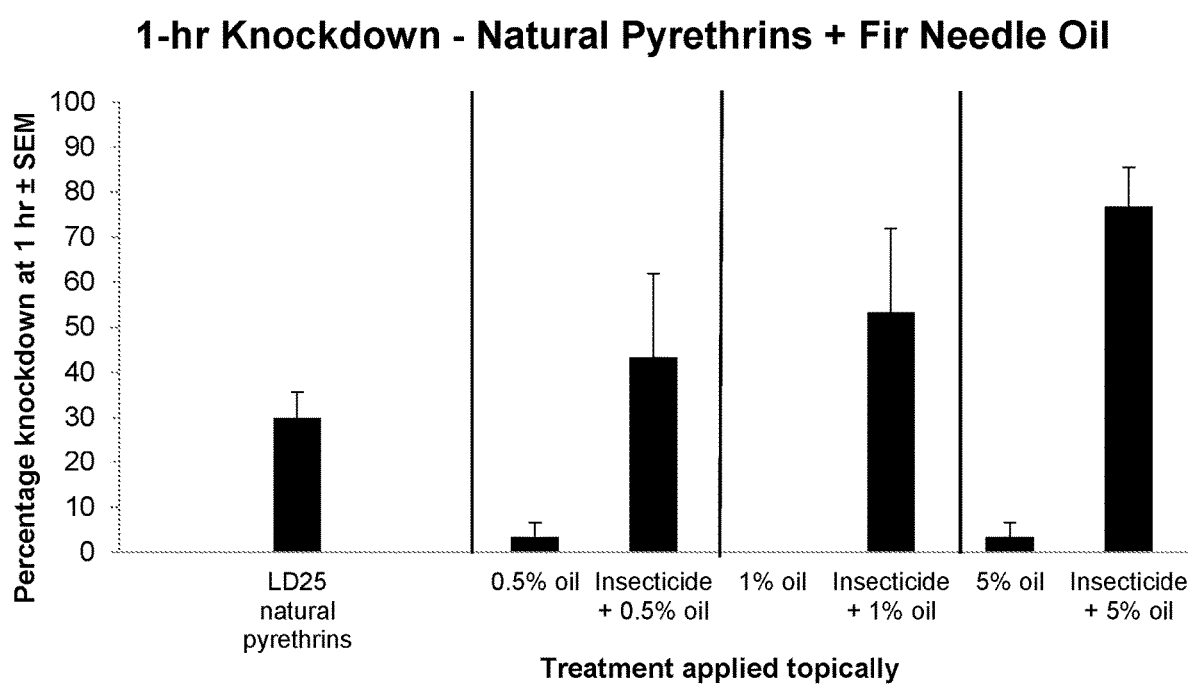
FIG. 1 is a graph showing percentage 1-hr knockdown of *Aedes aegypti* mosquitoes treated with fir needle oil at various concentrations alone or in combination with an estimated $LD_{25}$ of natural pyrethrins.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, organic chemistry, insect control, pest control, entomology, toxicology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for compositions and methods relating to insecticides. Compositions and methods as described herein represent improvements over existing insecticide compositions and methods at least by providing compositions and methods that improve efficacy (improved insect knockdown and/or mortality) compared to existing compositions and methods while maintaining a low toxicity profile, in regard to humans and other mammals.

Described herein are insecticide compositions (also referred to herein as "insecticidal compositions," "pesticidal compositions," or "pesticide compositions"). In embodiments according to the present disclosure, insecticide compositions comprise an essential oil. In embodiments according to the present disclosure, insecticide compositions as described herein comprise an insecticide and an essential oil.

In embodiments according to the present disclosure, insecticide compositions as described herein consist essentially or an insecticide and an essential oil. Insecticide compositions as described herein can leverage synergism between the insecticide and essential oil in order to improve efficacy of the insecticide composition. In certain aspects, the insecticide composition can improve knockdown over the use of the insecticide alone. In certain aspects, the insecticide composition can improve mortality compared to the use of the insecticide alone. In certain aspects, insecticide compositions comprising insecticides and essential oils are combinations of compositions that are not naturally occurring and provide a concentration of active ingredients in the compositions that are higher than what may be naturally occurring.

Insecticides of insecticide compositions as described herein can be of the carbamate, organochloride, organophosphate, pyrethroid, neonicotinoid, sulfoximine, butenolide, mesoionic, spinosyn, avermectin, milbemycin, pyridine azomethines, pyropene, phenylpyrazole, oxidiazine, semicarbazone, tetronic and tetramic acid, flonicamid, diamide, isoxazoline, azadiractin, pyridalyl, beta-ketonitrile, carboxanilide, ryanoid, mite growth inhibitors, clofentazine, diflovidazin, hexythiazox, etoxazole, buprofezin, cyromazine, amitraz, diacylhydrazine, pyrrole respiration uncouplers, electron transport inhibitors, hydramethylnon, acequinocyl, fluacrypyrim, bifenazate, or METI acaricide.class.

Insecticides of insecticide compositions as described herein can be: an acetylcholinesterase (AChE) inhibitor (for example a carbamate, such as alanycarb or aldicarb, or an organophosphate, such as acephate or azamethiphos); a gamma-Aminobutyric acid (GABA)-gated chloride channel blocker (for example a cyclodiene or organochlorine, such as chlordane or endosulfan, or a phenylpyrazole, such as ethiprole or fipronil); a sodium channel modulator (for example pyrethroids and pyrethrins, such as acrinathrin or allethrin, or dichlorodiphenyltrichloroethane or methoxychlor); a nicotinic acetylcholine receptor (nAChR) competitive modulator (for example a neonicotinoid, nicotine, sulfoximine, butenolides, or mesoionics); a nicotinic acetylcholine (nAChR) allosteric modulator—site I (for example spinosyns, such as spinetoram or spinosad); a glutamate-gated chloride channel (GluCl) allosteric modulator (for example Avermectins or Milbemycins); a juvenile hormone mimic (for example juvenile hormone analogues, such as hydroprene, or fenoxycarb or pyriproxyfen); an alkyl halide (for example methyl bromide); chloropicrin, a fluoride (for example cryolite or sulfuryl fluoride); a borate (for example borax or boric acid); tartar emetic; a methyl isothiocyanate generator (for example dazomet or metam); a chordotonal organ transient receptor potential channel (vanilloid) (TRPV) channel modulator (for example a pyridine azomethine derivative or pyropenes); a mite growth inhibitor affecting chitin synthase 1 (CHS1) (for example clofentezine, diflovidazin, or hexythiazox, or etoxazole); a microbial disruptor of insect midgut membranes (for example a *Bacillus thuringiensis*, *Bacillus sphaericus* or one or more proteins produced by either); an inhibitor of mitrochondrial ATP synthase (for example diafenthiuron, organotin miticides, propargite, or tetradifon); an uncoupler of oxidative phosphorylation via disruption of the proton gradient (for example pyrroles, dinitrophenols, or sulfluramid); a nicotinic acetylcholine receptor (nAChR) channel blocker (for example a nereistoxin analog such as bensultap); an inhibitor of chitin biosynthiesis affecting CHS1 (for example benzoylureas such as bistrifluron); an inhibitor of chitin biosynthesis type 1 (for example buprofezin); a molting disruptor, dipteran (for example cyromazine); an ecdysone receptor agonist (for example diacylhydrazines, such as chromofenozide); an octopamine receptor agonist (for example amitraz); a mitochondrial complex III electron transport inhibitor (for example hydramethylnon, acequinocyl, fluacrypyrim, or bifenazate); a mitochondrial complex I electron transport inhibitor (for example mitochondrial electron transport inhibitor (METI) acaricides and insecticides, such as fenazaquin and fenpyroximate, or rotenone); a voltage-dependent sodium channel blocker (for example oxadiazines, such as indoxacarb, or semicarbazones, such as metaflumizone); an inhibitor of acetyl CoA carboxylase (for example tetronic and tetramic acid derivatives, such as spirodiclofen, spiromesifen, and spirotetramat); a mitochondrial complex IV electron transport inhibitor (for example phosphides, such as aluminum phosphide, calcium phosphide, phosphine, or zinc phosphide, or cyanides, such as calcium cyanide, potassium cyanide, or sodium cyanide); a mitochondrial complex II electron transport inhibitor (for example beta-ketonitrile derivatives, such as cyenopyrafen, or carboxanilides, such as pyflubumide); a ryanodine receptor modulator (for example diamides, such as chlorantraniliprole, cyantraniliprole, cyclaniliprole, or flubendiamide); a chordotonal organ modulator (for example flonicamid); a GABA-gated chloride channel allosteric modulator (for example meta-diamides or isoxazolines, such as fluralaner, broflanilide, or fluxametamide); a baculovirus (for example a granulovirus, such as Cydiapomonella GV, or a nucleopolyhedrovirus, such as *Anticarsia gemmatalis* MNPV or *Helicoverpa armigera* NPV); a nicotinic acetylcholine receptor (nAChR) allosteric modulator—site II (for example GS-omega/kappa HXTX-Hv1a peptide); azadirachtin; benzoximate; bromopropylate; chinomethionat; dicofol; lime sulfur; mancozeb; pyridalyl; sulfur; *Burkholderia* spp; *Wolbachia pipientis* (Zap); *Chenopodium ambrosioides* near *ambrosioides* extract; fatty acid monoesters with glycerol or propanediol Neem oil; fungal agents (for example *Beauveria bassiana* strains, Metarhizium anisopliae strain F52, or *Paecilomyces* fumosoroseus Apopka strain 97); or diatomaceous earth.

Without intending to be limiting, embodiments of insecticides according to the present disclosure include: fenitrothion [O,O-dimethyl O-(3-methyl-4-nitrophenyl) phosphorothioate], fenthion [O,O-dimethyl O-(3-methyl-4-(methythio)phenyl) phosphorothioate], dibrom [dimethyl-1, 2-dibromo-2,2-dichlorethyl phosphate], diazinon [O,O-diethyl O-2-isopropyl-6-methylpyrmidin-4-yl phosphorothioate], chlorpyrifos [O,O-diethyl O-3,5,6-trichloro-2-pyridyl phosphorothioate], DDVP [2,2-dichlorovinyl dimethyl phosphate], cyanophos [O-4-cyanophenyl O,O-dimethyl phosphorothioate], dimethoate [O,O-dimethyl S—(N-methylcarbamoylmethyl) dithiophosphate], pirimiphos methyl [O-[2-(Diethylamino)-6-methylpyrimidin-4-yl] O,O-dimethyl phosphorothioate]; phenthoate [ethyl 2-dimethoxyphosphinothioylthio(phenyl)acetate], malathion [diethyl (dimethoxyphosphinothioylthio)succinate], and azinphos-methyl [S-3,4-dihydro-4-oxo-1,2,3-benzotrazin-3-ylmethyl O,O-dimethyl phosphorodithioate]; carbamate compounds such as BPMC (2-sec-butylphenyl methylcarbamate), benfracarb [ethyl N-[2,3-dihydro-2,2-dimethyl-benzofuran-7-yloxycarbonyl (methyl)aminothio]-N-isopropyl-β-alaninate], propoxur [2-isopropoxyphenyl N-methylcarbamate] and carbaryl [1-naphthyl-N-methylcarbamate], methomyl [S-methyl-N-[(methylcarbamoyl)oxy] thioacetimidate]; pyrethroid compounds such as etofenprox [2-(4-ethoxyphenyl)-2-methylpropyl-3-phenoxybenzyl ether], fenvalerate [(RS)-α-cyano-3-phenoxybenzyl (RS)-2-(4-chlorophenyl)-3-methylbutyrate], esfenvalerate [(S)-α-cyano-3-phenoxybenzyl (S)-2-(4-chlorophenyl)-3-methylbutyrate], fenpropathrin [(RS)-α-cyano-3-phenoxybenzyl 2,2,3,3-tetramethylcyclopropanecarboxylate], cypermethrin [(RS)-α-cyano-3-phenoxybenzyl (1RS)-cis,trans-3-(2,2-dichlorovinyl)-2,2-dimethylcyclopropanecarboxylate], permethrin [3-phenoxybenzyl (1RS)-cis,trans-3-(2,2-dichlorovinyl)-2,2-dimethylcyclopropanecarboxylate], cyhalothrin [(RS)-α-cyano-3-phenoxybenzyl (Z)-(1RS)-cis-3-(2-chloro-3,3,3-trifluoroprop-1-enyl)-2,2-dimethylcyclopropanecarboxylate], deltamethrin [(S)-α-cyano-3-phenoxybenzyl (1R)-cis-3-(2,2-dibromovinyl)-2,2-dimethylcyclopropanecarboxylate], cyclopothrin [(RS)-α-cyano-3-phenoxybenzyl (RS)-2,2-dichloro-1-(4-ethoxyphenyl)cyclopropanecarboxylate], fluvalinate [α-cyano-3-phenoxybenzyl N-(2-chloro-α,α,α-trifluoro-p-tolyl)-D-valinate], bifenthrin [2-methylbiphenyl-3-ylmethyl (Z)-(1RS)-cis-3-(2-chloro-3,3,3-trifluoroprop-1-enyl)-2,2-dimethylcyclopropanecarboxylate], 2-methyl-2-(4-bromodifluoromethoxyphenyl) propyl 3-phenoxybenzyl ether, tralomethrin [(S)-α-cyano-3-phenoxybenzyl (1R-cis)-3-{(1RS)(1,2,2,2-tetrabromoethyl)}-2,2-dimethylcyclopropanecarboxylate], silafluofen [(4-ethoxyphenyl){3-(4-fluoro-3-phenoxyphenyl)propyl}dimethylsilane], d-phenothrin [3-phenoxybenzyl (1R-cis, trans)-chrysanthemate], cyphenothrin [(RS)-α-cyano-3-phenoxybenzyl (1R-cis,trans)-chrysanthemate], d-resmethrin [5-benzyl-3-furylmethyl (1R-cis,trans)-chrysanthemate], acrinathrin [(S)-α-cyano-3-phenoxybenzyl (1R,cis(Z))-2,2-dimethyl-3-{3-oxo-3-(1,1,1,3,3,3-hexafluoropropyloxy) propenyl}cyclopropanecarboxylate], cyfluthrin [(RS)-α-cyano-4-fluoro-3-phenoxybenzyl 3-(2,2-dichlorovinyl)-2,2-dimethylcyclopropanecarboxylate], tefluthrin [2,3,5,6-tetrafluoro-4-methylbenzyl (1RS-cis(Z))-3-(2-chloro-3,3,3-trifluoroprop-1-enyl)-2,2-dimethylcyclopropane- carboxylate], transfluthrin [2,3,5,6-tetrafluorobenzyl (1R-trans)-3-(2,2-dichlorovinyl)-2,2-dimethylcyclopropanecarboxylate], tetramethrin [3,4,5,6-tetrahydrophthalimidomethyl (1RS)-cis,trans-chrysanthemate], allethrin [(RS)-3-allyl-2-methyl-4-oxocyclopent-2-enyl (1RS)-cis,trans-chrysanthemate], prallethrin [(S)-2-methyl-4-oxo-3-(2-propynyl)cyclopent-2-enyl (1R)-cis,trans-chrysanthemate], empenthrin [(RS)-1-ethynyl-2-methyl-2-pentenyl (1R)-cis, trans-chrysanthemate], imiprothrin [2,5-dioxo-3-(prop-2-ynyl)imidazolidin-1-ylmethyl (1R)-cis,trans-2,2-dimethyl-3-(2-methylprop-1-enyl)cyclopropanecarboxylate], d-furamethrin [5-(2-propynyl)furfuryl (1R)-cis,trans-chrysanthemate] and 5-(2-propynyl)furfuryl 2,2,3,3-tetramethylcyclopropa- necarboxylate; nitroimidazole derivatives such as imidacloprid (1-(6-chloro-3-pyridylmethyl)-N-nitroimidazolidin-2-ylideneamine); N-cyanoamidine derivatives such as N-cyano-N'-methyl-N'-(6-chloro-3-pyridylmethyl)acetamidine; nitenpyram [N-(6-chloro-3-pyidylmethyl)-N-ethyl-N-methyl-2-nitrovynylidenediamine]; thiacloprid [1-(2-chloro-5-pyridylmethyl)-2-cyanoiminothiazoline]; thiamethoxam [3-((2-chloro-5-thiazolyl) methyl)-5-methyl-4-nitroiminotetrahydro-1,3,5-oxadiazine]; dinotefuran [2-methyl-1-nitro-3-[(tetrahydro-3-furanyl) methyl] guanidine]; clothianidin [1-(2-Chloro-1,3-thiazol-5-ylmethyl)-3-methyl-2-nitroguanidine]; 1-methyl-2-nitro-3-((3-tetrahydrofuryl) methyl)guanidine; imidacloprid 1-(2-chloro-5-thiazolyl) methyl-3-methyl-2-nitroguanidine; nitroiminohexahydro-1,3,5-trazine derivatives; chlorinated hydrocarbons such as endosulfan [6,7,8,9,10,10-hexachloro-1,5,5a,6,9,9a-hexahydro-6,9-methano-2,4,3-benzodioxathiepine oxide], γ-BHC [1,2,3,4,5,6-hexachlorocyclohexane] and 1,1-bis (chlorophenyl)-2,2,2-trichloroethanol; benzoylphenylurea compounds such as chlorfluazuron [1-(3,5-dichloro-4-(3- chloro-5-trifluoromethylpyridyn-2-yloxy)phenyl)-3-(2,6-difluorobenzoyl)urea], teflubenzuron [1-(3,5-dichloro-2,4-difluorophenyl)-3-(2,6-difluorobenzoyl)urea] and flufenoxuron [1-(4-(2-chloro-4-trifluoromethylphenoxy)-2-fLuorophenyl)-3-(2,6-difluorobenzoyl)urea]; juvenile hormone like compounds such as pyriproxyfen [4-phenoxyphenyl 2-(2-pyridyloxy)propyl ether], methoprene [isopropyl (2E,4E)-11-methoxy-3,7,11-trmethyl-2,4-dodecadienoate] and hydroprene [ethyl (2E,4E)-11-methoxy-3,7,11-trmethyl-2,4-dodecadienoate]; thiourea derivatives such as diafenthiuron [N-(2,6-diisopropyl-4-phenoxyphenyl)-N'-tert-butylcarbodiimide]; phenylpyrazole compounds; 4-bromo-2-(4-chlorophenyl)-1-ethoxymethyl-5-trifluoromethylpyrrol-3-carbonitrile [chlorfenapyr]; metoxadiazone [5-methoxy-3-(2-methoxyphenyl)-1,3,4-oxadiazol-2(3H)-one], bromopropylate [isopropyl 4,4-dibromobenzilate], tetradifon [4-chlorophenyl 2,4,5-trichlorophenyl sulfone], chinomethionat [S,S-6-methylquinoxaline-2,3-diyldithiocarbonate], pyridaben [2-tert-butyl-5-(4-tert-butylbenzylthio)-4-chloropyrdazin-3(2H)-one], fenpyroximate [tert-butyl (E)-4-[(1,3-dimethyl-5-phenoxypyrazol-4-yl)methyleneaminooxymethyl] benzoate], tebufenpyrad [N-(4-tert-butylbenzyl)-4-chloro-3-ethyl-1-methyl-5-pyrazolecarboxamide], polynactins complex [tetranactin, dinactin and trinactin], pyrimidifen [5-chloro-N-[2-{4-(2-ethoxyethyl)-2,3-dimethylphenoxy} ethyl]-6-ethylpyrimidin-4-amine], milbemectin/milbemycin, abamectin, ivermectin and azadirachtin [AZAD].

Other embodiments of insecticides according to the present disclosure include veratrine, Sabadilla, paraffin oil, cottonseed oil, and all forms of *Bacillus thuringiensis*.

In embodiments according to the present disclosure, the insecticide can be an organophosphate. In embodiments according to the present disclosure, the insecticide is naled (Dibrom®).

In embodiments according to the present disclosure, the insecticide can be a neonicotinoid. In embodiments according to the present disclosure, the insecticide is clothianidin.

In embodiments according to the present disclosure, the insecticide can be a pyrethroid or pyrethrin (i.e. naturally occurring organic compounds extracted and isolated in a non-naturally occurring form from *Chrysanthemum cinerariifolium* or synthetic derivative thereof). In embodiments according to the present disclosure, the insecticide is natural pyrethrin[s] (for example group I or II pyrethrins, such as pyrethrin I, cinerin I, jasmolin I, pyrethrin II, cinerin II, jasmolin II, individually or in combination, or compositions extracted and isolated from the *Chrysanthemum* flower through petroleum extraction or extraction with another organic solvent, and concentrated to a concentration higher than naturally occurring), permethrin, or deltamethrin, individually or in combination. Pyrethrins according to the present disclosure are present in compositions as described herein at a concentration higher than what would otherwise be considered naturally occurring.

In embodiments of the present disclosure, an insecticide composition comprises an insecticide, the insecticide being one or more of permethrin, natural pyrethrins (NPs), fipronil, imidacloprid, thiamethoxan, naled, or clothianidin. In embodiments, the insecticide is fipronil. In embodiments, the insecticide is fipronil. In embodiments, the insecticide is imidacloprid. In embodiments, the insecticide is thiamethoxan. In embodiments, the insecticide is naled. In embodiments, the insecticide is permethrin. In embodiments, the insecticide comprises natural pyrethrins. In embodiments, the insecticide is clothianidin.

Essential oils as described herein are plant essential oils. In certain aspects, essential oils as described herein are comprised of monoterpenoid and sesquiterpenoid compounds. In certain aspects, essential oils from plants are naturally occurring organic compounds extracted and isolated in a non-naturally occurring form by steam distillation or other methods from a plant or part of a plant thereof. Organic compounds of the essential oils as described herein are also present in compositions as described herein at a concentration higher than what would otherwise be considered naturally occurring.

In embodiments according to the present disclosure, the essential oil is: fir needle oil, dill seed, balsam copaiba, fennel, balsam Peru, guaiacwood, Canadian balsam fir, nutmeg east indies, ginger root, parsley seed oil, cedarleaf, orange oil, cypress, cedarwood Virginia, cade, cedarwood Texas, *galbanum*, clove leaf oil, helichrysum, geranium bourbon, cardamom, dillweed, or nootkatone, individually or in combination. In an embodiment, the essential oil is fir needle oil.

In embodiments, the essential oil comprises bornyl acetate. In embodiments, the essential oil comprises delta-3-carene. In embodiments, the essential is fir needle oil comprising bornyl acetate. In embodiments, the essential oil is bornyl acetate. In embodiments, the essential oil is fir needle oil comprising delta-3-carene. In embodiments, the essential oil is delta-3-carene.

In embodiments, the insecticide composition can comprise about 0.1% to about 99.9% insecticide composition and about 99.9% to about 0.1% of a suitable carrier to total 100%. It is understood that a suitable carrier can be chosen by the skilled artisan according to considerations such as administration route and pest.

In embodiments, the insecticide composition can comprise about 0.5% essential oil and about 99.5% insecticide. In embodiments, the insecticide composition can comprise about 1% essential oil and about 99% insecticide. In embodiments, the insecticide composition can comprise about 5% essential oil and about 95% insecticide. In embodiments, the insecticide composition can comprise about 10% essential oil and about 90% insecticide. In embodiments, the insecticide composition can comprise about 15% essential oil and about 85% insecticide. In embodiments, the insecticide composition can comprise about 20% essential oil and about 80% insecticide. In embodiments, the insecticide composition can comprise about 25% essential oil and about 75% insecticide. In embodiments, the insecticide composition can comprise about 30% essential oil and about 70% insecticide. In embodiments, the insecticide composition can comprise about 35% essential oil and about 65% insecticide. In embodiments, the insecticide composition can comprise about 40% essential oil and about 60% insecticide. In embodiments, the insecticide composition can comprise about 45% essential oil and about 55% insecticide. In embodiments, the insecticide composition can comprise about 50% essential oil and about 50% insecticide. In embodiments, the insecticide composition can comprise about 55% essential oil and about 45% insecticide. In embodiments, the insecticide composition can comprise about 60% essential oil and about 40% insecticide. In embodiments, the insecticide composition can comprise about 65% essential oil and about 35% insecticide. In embodiments, the insecticide composition can comprise about 70% essential oil and about 30% insecticide. In embodiments, the insecticide composition can comprise about 75% essential oil and about 25% insecticide. In embodiments, the insecticide composition can comprise about 80% essential oil and about 20% insecticide. In embodiments, the insecticide composition can comprise about 85% essential oil and about 15% insecticide. In embodiments, the insecticide composition can comprise about 90% essential oil and about 10% insecticide. In embodiments, the insecticide composition can comprise about 95% essential oil and about 5% insecticide. In embodiments, the insecticide composition can comprise about 99% essential oil and about 9% insecticide. In embodiments, the insecticide composition can comprise about 99.5% essential oil and about 0.5% insecticide.

In embodiments, the insecticide composition can comprise about 0.5% insecticide composition and about 99.5% carrier. In embodiments, the insecticide composition can comprise about 1% insecticide composition and about 99% carrier. In embodiments, the insecticide composition can comprise about 5% insecticide composition and about 95% carrier. In embodiments, the insecticide composition can comprise about 10% insecticide composition and about 90% carrier. In embodiments, the insecticide composition can comprise about 15% insecticide composition and about 85% carrier. In embodiments, the insecticide composition can comprise about 20% insecticide composition and about 80% carrier. In embodiments, the insecticide composition can comprise about 25% insecticide composition and about 75% carrier. In embodiments, the insecticide composition can comprise about 30% insecticide composition and about 70% carrier. In embodiments, the insecticide composition can comprise about 35% insecticide composition and about 65% carrier. In embodiments, the insecticide composition can comprise about 40% insecticide composition and about 60% carrier. In embodiments, the insecticide composition can comprise about 45% insecticide composition and about 55% carrier. In embodiments, the insecticide composition can comprise about 50% insecticide composition and about 50% carrier. In embodiments, the insecticide composition can comprise about 55% insecticide composition and about 45% carrier. In embodiments, the insecticide composition can comprise about 60% insecticide composition and about 40% carrier. In embodiments, the insecticide composition can comprise about 65% insecticide composition and about 35% carrier. In embodiments, the insecticide composition can comprise about 70% insecticide composition and about 30% carrier. In embodiments, the insecticide composition can comprise about 75% insecticide composition and about 25% carrier. In embodiments, the insecticide composition can comprise about 80% insecticide composition and about 20% carrier. In embodiments, the insecticide composition can comprise about 85% insecticide composition and about 15% carrier. In embodiments, the insecticide composition can comprise about 90% insecticide composition and about 10% carrier. In embodiments, the insecticide composition can comprise about 95% insecticide composition and about 5% carrier. In embodiments, the insecticide composition can comprise about 99% insecticide composition and about 9% carrier. In embodiments, the insecticide composition can comprise about 99.5% insecticide composition and about 0.5% carrier.

In embodiments, the insecticide composition can comprise insecticide in an effective amount to knockdown down or induce mortality in a pest as described herein. In embodiments, the effective amount of insecticide is ±10%, ±20%, ±30%, or ±40% of a calculated $LD_{50}$ or $KD_{50}$ as disclosed herein, or an $LD_{50}$ or $KD_{50}$ adjusted based on values described herein and the body weight of the insect or pest species against which the composition should be used against. $LD_{50}$ and $KD_{50}$ values are provided as ng dose per mg of insect body weight. It would be understood by the skilled artisan that these values could be adjusted according to the desired insect species or genus against which compositions are to be used against.

In an embodiment, a synergist such as piperonyl butoxide (PBO) can be a component of the insecticide composition, either in place of or supplementing the essential oil of insecticide compositions as described herein.

In embodiments according to the present disclosure, insecticide compositions as described herein can comprise about 0.001% to about 50% of PBO. In embodiments according to the present disclosure, insecticide compositions as described herein can comprise about 0.001% to about 10% of PBO. In embodiments according to the present disclosure, insecticide compositions as described herein can comprise about 0.5% to about 10% of PBO. In embodiments according to the present disclosure, insecticide compositions as described herein can comprise about 1% to about 10% of PBO. In embodiments according to the present disclosure, insecticide compositions as described herein can comprise about 1% to about 5% of PBO. In embodiments according to the present disclosure, insecticide compositions as described herein can comprise about 2% to about 9% of PBO. In embodiments according to the present disclosure, insecticide compositions as described herein can comprise about 3% to about 8% of PBO. In embodiments according to the present disclosure, insecticide compositions as described herein can comprise about 4% to about 7% of PBO. In embodiments according to the present disclosure, insecticide compositions as described herein can comprise about 5% to about 6% of PBO. In embodiments according to the present disclosure, insecticide compositions as described herein can comprise about 0.5% to about 5% of PBO. In embodiments according to the present disclosure, insecticide compositions as described herein can comprise about 5% to about 50% of PBO. In embodiments according to the present disclosure, insecticide compositions as described herein can comprise about 10% to about 40% of PBO. In embodiments according to the present disclosure, insecticide compositions as described herein can comprise about 15% to about 35% of PBO. In embodiments according to the present disclosure, insecticide compositions as described herein can comprise about 20% to about 30% of PBO. In embodiments according to the present disclosure, insecticide compositions as described herein can comprise about 25% of PBO.

In embodiments according to the present disclosure, insecticide compositions as described herein can comprise about 0.001% to about 50% of the essential oil. In embodiments according to the present disclosure, insecticide compositions as described herein can comprise about 0.001% to about 10% of the essential oil. In embodiments according to the present disclosure, insecticide compositions as described herein can comprise about 0.5% to about 10% of the essential oil. In embodiments according to the present disclosure, insecticide compositions as described herein can comprise about 1% to about 10% of the essential oil. In embodiments according to the present disclosure, insecticide compositions as described herein can comprise about 1% to about 5% of the essential oil. In embodiments according to the present disclosure, insecticide compositions as described herein can comprise about 2% to about 9% of the essential oil. In embodiments according to the present disclosure, insecticide compositions as described herein can comprise about 3% to about 8% of the essential oil. In embodiments according to the present disclosure, insecticide compositions as described herein can comprise about 4% to about 7% of the essential oil. In embodiments according to the present disclosure, insecticide compositions as described herein can comprise about 5% to about 6% of the essential oil. In embodiments according to the present disclosure, insecticide compositions as described herein can comprise about 0.5% to about 5% of the essential oil. In embodiments according to the present disclosure, insecticide compositions as described herein can comprise about 5% to about 50% of the essential oil. In embodiments according to the present disclosure, insecticide compositions as described herein can comprise about 10% to about 40% of the essential oil. In embodiments according to the present disclosure, insecticide compositions as described herein can comprise about 15% to about 35% of the essential oil. In embodiments according to the present disclosure, insecticide compositions as described herein can comprise about 20% to about 30% of the essential oil. In embodiments according to the present disclosure, insecticide compositions as described herein can comprise about 25% of the essential oil. In embodiments, insecticide compositions comprise about 5% of the essential oil. In embodiments, insecticide compositions comprise about 5% w/v of the essential oil. In embodiments, insecticide compositions comprise 4.5% to 5.5% of the essential oil. In embodiments, insecticide compositions comprise 4% to 6% of the essential oil. In embodiments, the percentage is % w/v.

Compositions as described herein can utilize a liquid carrier, for example ethanol. Without intending to be limiting, other suitable carriers can be mineral oil, industrial grade emulsifiers, organic solvents, extracts, adjuvants, and others as known in the art.

In embodiments, pesticidal compositions of the present disclosure comprise the insecticide composition and a carrier, for example an inert carrier, such as a solid carrier, a liquid carrier, a gaseous carrier and/or bait material (to make poison bait material).

Insecticidal compositions as described herein may be impregnated with a base material (e.g. porous ceramic board, non-woven cloth, paper, mosquito-coil base). Further, pesticidal compositions of the present disclosure optionally comprise a surfactant or the other auxiliary to be formulated to oil solutions, emulsifiable concentrates, wettable powders, flowable formulations, granules, dusts, aerosols, foggings, heating fumigants, smokings, poison baits, microcapsule formulations, ULV formulations, spot-on formulations, pour-on formulations, shampoo formulations, sheet formulations, resin formulations and so forth, as known in the art.

In embodiments, insecticidal compositions include the insecticidal composition as an active ingredient in an amount of 0.01 to 95% by weight.

Examples of a solid carrier to be used for formulations as described herein include fine powder or granules of clays (e.g. kaolin clay, diatomaceous earth, synthetic hydrated silicon oxide, bentonite, Fubasami clay, acid clay), talc, ceramics, fertilizer (e.g. ammonium sulfate, ammonium phosphate, ammonium nitrate, ammonium chloride, urea) and other inorganic minerals (e.g. sericite, quartz, sulfur, activated carbon, calcium carbonate, hydrated silicon oxide).

Examples of a liquid carrier for formulations as described herein include water, alcohols (e.g. methanol, ethanol), ketones (e.g. acetone, methyl ethyl ketone), aromatic hydrocarbons (e.g. toluene, xylene, ethylbenzene, methylnaphthalene), aliphatic hydrocarbons (e.g. hexane, cyclohexane, kerosene, gas oil), esters (ethyl acetate, butyl acetate), nitriles (e.g. acetonitrile, isobutyronitrile), ethers (e.g. diisopropyl ether, dioxane), acid amides (e.g. N,N-dimethylformamide, N,N-dimethylacetamide), halogenated hydrocarbons (dichloromethane, trichloroethane, carbon tetrachloride), organic sulfur compounds (e.g. dimethyl sulfoxide) and vegetable oils (e.g. soybean oil, cottonseed oil).

Examples of a gaseous carrier include fluorocarbons, butanegas, LPG (liquefied petroleum gas), dimethyl ether and carbon dioxide.

Examples of a surfactant include alkyl sulfates, alkylsulfonates, alkylarylsulfonates, alkyl aryl ethers, polyoxyethylenealkyl aryl ethers, polyethylene glycol ethers, polyhydric alcohol esters and sugar alcohol derivatives.

Examples of the other auxiliaries include sticking agents, dispersing agent and stabilizing agents, typically, casein, gelatin, polysaccharides (e.g. starch, gum arabic, cellulose derivatives, alginic acid), lignin derivatives, synthetic water-soluble polymers (e.g. polyvinyl alcohol, polyvinylpyrrolidone, polyacrylic acids), PAP (acid isopropyl phosphate), BHT (2,6-di-tert-butyl-4-methyphenol), BHA (mixture of 2-tert-butyl-4-methoxyphenol and 3-tert-butyl-4-methoxyphenol), vegetable oils, mineral oils, fatty acids and esters of fatty acid.

Also described herein are methods of use of insecticide compositions as described herein. Methods of use of insecticide compositions as described herein can comprise administering a composition as described herein Methods of administration can comprise administering a composition as described herein to an environment in need thereof.

An environment in need thereof, without intending to be limiting, can comprise atmosphere (i.e. air) and/or one or more surfaces thereof (i.e. part of a plant, soil, vegetation therein, swamps, forests, fields, trees, surface of human living space, such as a floor, window, counter, furniture, and the like, skin of a subject in need thereof, such as the skin of a human or animal) in which a mosquito (for example *Aedes aegypti* or *Anopheles gambiae*, or other genera such as *Culex, Culiseta, Mansonia, Psorophora, Coquellitidia, Uranotaenia, Orthopodomyia, Wyeomyia, Corethrella*) or other insects or pests as described herein resides or otherwise are introduced to or at risk for introduction to (fly through, fly around, land on, rest on, etc.). In certain aspects, the environment in need thereof is an environment at risk for infestation of one or more pests as described herein. In certain aspects, an environment in need thereof can be any part (anatomical part) of the mosquito or insect or pest itself. In an embodiment, administering to an environment in need thereof comprises ingestion of an insecticide composition as described herein by a mosquito or insect pest as described herein.

In embodiments according to the present disclosure, an insecticide composition as described herein can be administered to an environment in need thereof in an effective amount. In embodiments according to the present disclosure, an effective amount, as described herein, is an amount suitable to induce knockdown and/or mortality of an insect, pest, or mosquito as described herein. As described herein, in embodiments according to the present disclosure, an effective amount is an amount suitable to induce knockdown and/or mortality of an insect, pest, or mosquito as described herein that is also an amount that is non-toxic to humans or other mammalian species. See the Examples below for embodiments of effective amounts.

Without intending to be limiting, other insects or pests that can be subject to insecticide compositions and methods as described herein are:

Hemiptera Insects (for example: Delphacidae (planthoppers) such as *Laodelphax striatellus* (small brown planthopper), *Nilaparvata lugens* (brown planthopper), *Sogatella furcifera* (white-backed rice planthopper) and the like: Deltocephalidae (leafhoppers) such as *Nephotettix cincticeps* (green rice leafhopper), *Recilia dorsalis* (zig-zag rice leaf hopper), *Nephotettix virescens* (green rice leafhopper) and the like; Aphididae (aphids); stink bugs; Aleyrodidae (whiteflies); scales; Tingidae (lace bugs); Psyllidae (suckers) and the like);

Lepidoptera Insects (for example: Pyralidae such as *Chilo suppressalis* (rice stem borer), *Cnaphalocrocis medinalis* (rice leafroller), *Plodia interpunctella* (Indian meal moth) and the like); Noctuidae such as *Spodoptera litura* (tobacco cutworm), *Pseudaletia separata* (rice armyworm), *Mamestra brassicae* (cabbage armyworm) and the like; Pieridae such as *Pieris rapae crucivora* (common cabbageworm) and the like; Tortricidae such as *Adoxophyes* spp. and the like; Carposinidae; Lyonetiidae; Lymantriidae; Plusiinae; *Agrotis* spp. such as *Agrotis segetum* (turnip cutworm), *Agrotis ipsilon* (black cutworm) and the like; *Helicoverpa* spp.; *Heliothis* spp.; *Plutella xylostella*; Pamara guttata (rice skipper); Tinea pellionella (casemaking clothes moth); Tineola bisselliella (webbing clothes moth) and the like);

Diptera Insects (for example: *Culex* spp. such as *Culex pipiens pallens* (common mosquito), *Culex quinquefasciatus* and the like, *Aedes* spp. such as *Aedes aegypti*, *Aedes albopictus* and the like; *Anopheles* spp. such as *Anopheles sinensis* and the like; Chironomidae (midges): Muscidae such as *Musca domestica* (housefly), *Muscina stabulans* (false stablefly), *Fannia canicularis* (little housefly) and the like; Calliphoridae; Sarcophagidae; Anthomyiidae such as *Delia platura* (seedcorn maggot), *Delia antiqua* (onion maggot) and the like; Tephritidae (fruit flies); Drosophilidae; Psychodidae (moth flies); Tabanidae; Simuliidae (black flies); Stomoxyidae (stable flies); Phoridae; Ceratopogonidae (biting midges) and the like);

Coleoptera Insects (Beetles) (for example: Corn rootworms such as *Diabrotica virgifera* (western corn rootworm), *Diabrotica undecimpunctata howardi* (southern corn rootworm) and the like; Scarabaeidae (scarabs) such as *Anomala cuprea* (cupreous chafer), *Anomala rufocuprea* (soybean beetle) and the like; Curculionidae (weevils) such as *Sitophilus zeamais* (maize weevil), *Lissorhoptrus oryzophilus* (ricewater weevil), ball weevil, *Callosobruchus chinensis* (adzuki bean weevil) and the like; Dermestidae such as *Authrenus verbasci* (varied carpet beetle), *Attagenus unicolor japonicus* (black carpet beetle) and the like; Tenebrionidae (darkling beetles) such as *Tenebrio molitor* (yellow mealworm), *Tribolium castaneum* (red flour beetle) and the like; Chrysomelidae (leaf beetles) such as *Oulema oryzae* (rice leaf beetle), *Phyllotreta stiolata* (striped flea beetle), *Aulacophora femoralis* (cucurbit leaf beetle) and the like; Anobiidae; *Epilachna* spp. such as *Epilachna vigintioctopunctata* (twenty-eight-spotted ladybird) and the like; Lyctidae (powderpost beetles), Bostrychidae (false powderpost beetles), Cerambycidae, *Paederus fuscipes* (robe beetle) and the like);

Dictvoptera Insects (for example: *Blattella germanica* (German cockroach): *Periplaneta fuliginosa* (smoky-brown cockroach); *Periplaneta americana* (American cockroach); *Periplaneta brunnea* (brown cockroach); *Blatta onientalis* (oriental cockroach) and the like);

Thvsanoptera Insects (*Thrips*) (for example: *Thrips palmi*, *Flankliniella occidentalis* (western flower *thrips*), *Thrips hawaiiensis* (flower *thrips*) and the like);

Hymenoptera Insects: Formicidae (ants); Vespidae (hornets); *Polistes* spp. (long-legged wasps); Bethylidae; Tenthredinidae (sawflies) such as Athalis *rosae* ruficornis (cabbage sawfly) and the like);

Orthoptera Insects (for example: Gryllotalpidae (mole crickets); Acrididae (grasshoppers) and the like);

Siphonaptera Insects (Fleas) (for example: *Ctenocephalides canis* (dog flea); *Ctenocephalides felis* (cat flea); *Pulex irritans*; and the like);

Anoplura Insects (Lice) (for example: *Pediculus corpods* (body louse); *Pediculus humanus* (head louse); *Pthirus pubis* (crab louse) and the like);

Isoptera Insects (for example: *Reticulitermes speratus*; *Coptotermes formosanus* (Formosan subterranean termite); and the like).

Harmful Acarina:

Ixodidae (Ticks); *Boophilus microplus*, *Haemaphysalis longiconis* and the like;

Tetranvchidae (spider mites) (for example: *Tetranychus cinnabarinus* (carmine spider mite); *Tetranychus urticae* (two-spotted spider mite); *Tetranychus kanzawai* (Kanzawa spider mite); *Panonychus citri* (citrus red mite); *Panonychus u/mi* (European red mite) and the like);

House-dust Mites (for example: Acaridae such as *Tyrophagus putrescentiae* (copra mite), *Aleuroglyphus ovatus* (brown legged grain mite) and the like; Dermanyssidae such as *Dermatophagoides farinae* (American house dust mite), *Dermatophagoides pteronyssinus* and so on; Glycyphagidae such as Glycyphagus privatus, Glycyphagus *domesticus*, Glycyphagus destructor and so on; Cheyletidae such as Chelacaropsis *malaccensis*, Cheyletus fortis and the like; Tarsonemidae; Chortoglyphus spp.; Haplochthonius spp. and the like);

Chiloqnatha (millipedes) (for example: Oxydus spp.: Chilopoda (centipedes) such as red centipede; wood lice such as Porcellio spp., Porcellionides spp.; and pill bugs such as Armadil/idium spp. and the like); and Bee mites (for example: *Varroa destructor*) and the like.

In embodiments, the insect or pest is a hematophagous pest.

In embodiments, the insect or pest is an arthropod. In embodiments, the arthropod is arthropod is selected form the group consisting of mosquitos, ticks, fleas, ants, corn borers, grain borers, beetles, flies, and cockroaches.

In embodiments, the arthropod is selected from the group consisting of blood-sucking insects, biting insects, cockroaches, mosquitoes, mites, blackfly, fleas, house flies, barn fly, face fly, bush fly, deer fly, horse fly, gnats, beetle, beer bug, louse, bed bug, earwig, ant, aphid, spruce bud worm, corn borer, sand flea, tsetse fly, assassin bug, biting flies, sand fly, stored grain pests, clothes moths, ticks, mites, spiders, phytophagous pests, and hematophagous pests.

Without intending to be limiting, administration of compositions as described herein according to methods as described herein can comprise aerosol administration, topical administration (i.e. by way of a cream or oil), injection by a needle or syringe, or other methods as known in the art, for example vaporization by the application of heat from a flame, fire, or electricity. Additional administration methods can comprise granular administration, dust administration, or administration by a wettable powder.

As would be understood by the skilled artisan, insecticide compositions as described herein can comprise additional additives or fillers depending on the intended administration route.

Formulations suitable for topical administration according to the present disclosure can be formulated as an ointment, cream, suspension, lotion, powder, solution, paste, gel, spray (for example an ultra-low volume spray), aerosol or oil. Alternatively, a formulation can comprise a patch or a dressing such as a bandage or adhesive plaster impregnated with active ingredients, and optionally one or more excipients or diluents.

Also described herein are insecticide-applicating devices and systems. Insecticide-applicating devices comprise insecticide compositions as described herein and an applicator. Applicators as described herein can be, for example, an aerosol spray can, a pump-spray bottle, a package for pharmaceutical cream (tube, etc), a syringe for injection, and such. In other embodiments, devices, systems, and methods as described herein (comprising insecticide compositions as described herein or effective amounts thereof) can be a space sprays, aerosols, ultra-low-volume sprays, fogging, treated surface, applied to livestock or companion animal, insecticidal bait stations, aerial applications, spray pump treatments, and the like as known in the art.

Finally described herein are insecticide kits. Kits as described herein can comprise an insecticide composition as described herein; and an applicator.

The applicator can be an aerosol spray can, a pump-spray bottle, a package for pharmaceutical cream, a fogger can, a bait station, or a syringe for injection.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Fir needle oil is a plant essential oil primarily comprised of several terpenoids that are more significantly represented in this oil compared to other plant essential oils. This plant essential oil has been screened in combination with natural pyrethrins to assess the ability of this oil and these compositions to increase mortality and knockdown at 24-hr and 1-hr, respectively. It has been found that fir needle oil, when applied at specific concentrations, significantly increases the knockdown of select insecticides (on *Aedes aegypti* mosquitoes), but not others. As described herein, all compounds were dissolved and applied topically in ethanol or acetone.

TABLE 1

Synergism ratios for 24-hr lethal dose ($LD_{50}$) and 1-hr knockdown ($KD_{50}$) values for a variety of public health insecticides applied topically on *Aedes aegypti* mosquitoes with and without 1% fir needle oil and corresponding synergism ratios (SR and KSR). In general, KSR values are higher than SR values for all insecticides screened in combination with fir needle oil at this concentration. $LD_{50}$ and $KD_{50}$ values provided as ng dose per mg of insect body weight.

| Treatment | $LD_{50}$ (ng/mg) | SR | $KD_{50}$ (ng/mg) | KSR |
|---|---|---|---|---|
| Clothianidin (Clo) | 4.5 | | 22 | |
| Clo + Fir Needle Oil 1% | 2 | 2.3 | 10.8 | 2 |
| Naled | 1.15 | | 1.05 | |
| Naled + Fir Needle Oil 1% | 0.8 | 1.4 | 0.64 | 1.6 |
| Natural pyrethrins (NP) | 1.1 | | 0.38 | |
| NP + Fir Needle Oil 1% | 1.9 | 0.6 | 0.15 | 2.5 |
| Permethrin (Pm) | 0.09 | | 0.06 | |
| Pm + Fir Needle Oil 1% | 0.1 | 0.9 | 0.06 | 1 |
| Deltamethrin (Dm) | 0.0017 | | 0.003 | |
| Dm + Fir Needle Oil 1% | 0.0018 | 0.9 | 0.0045 | 0.7 |

Example 2

Figure 2:
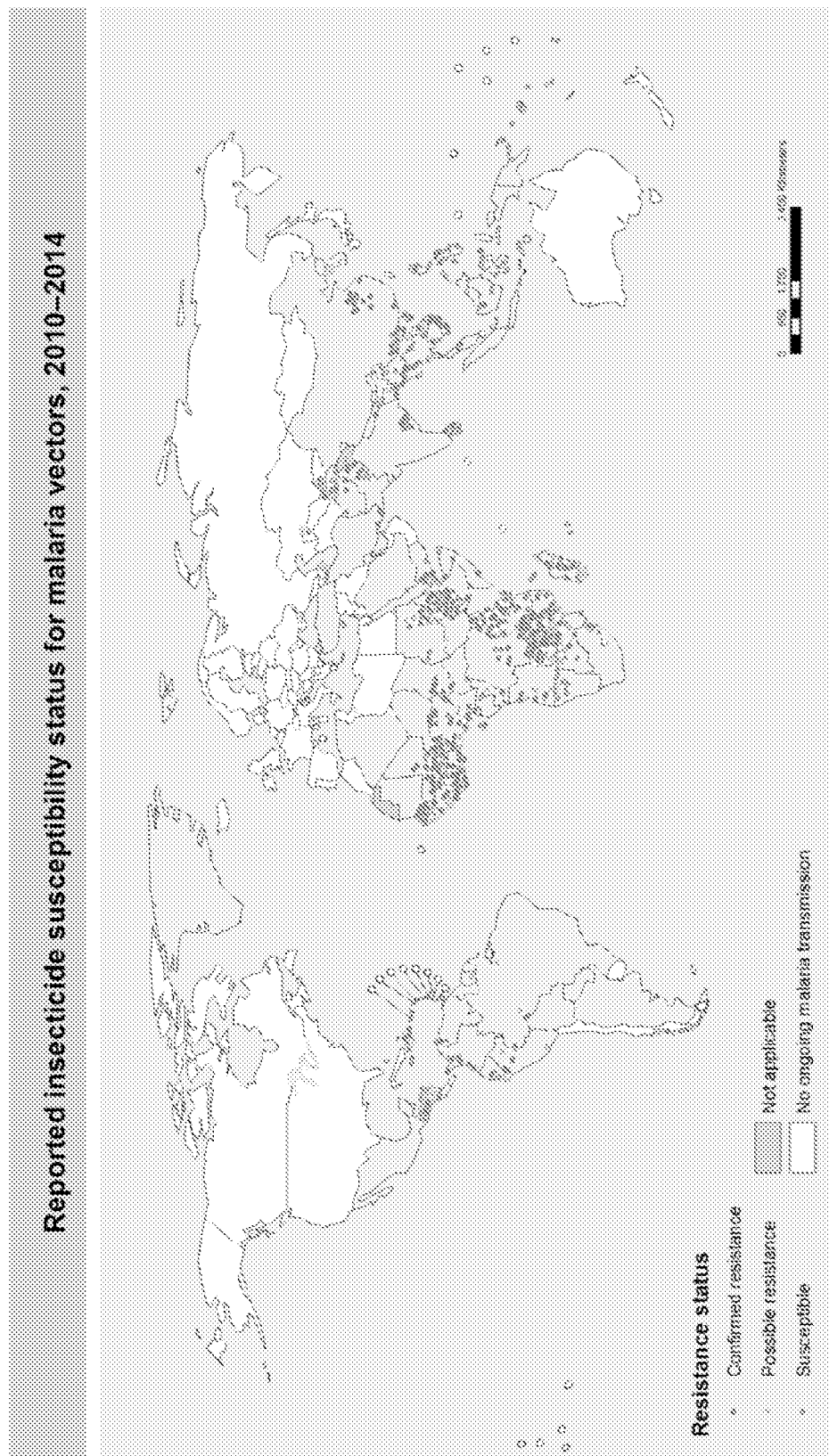
FIG. 2 is a map showing distribution of reported insecticide susceptibility status for malaria vectors, 2012-2014. This figure was adapted from the World Health Organization's website.

As previously described, there is a need for new insecticides, as there is currently an "evolutionary arms race" going on regarding insect evolution and pesticide resistance. Such pesticide resistance is exemplified in FIG. 2, which is a map showing distribution of reported insecticide susceptibility status (susceptible, possible resistance, and combined resistance) for malaria vectors, 2012-2014.

Figure 3:
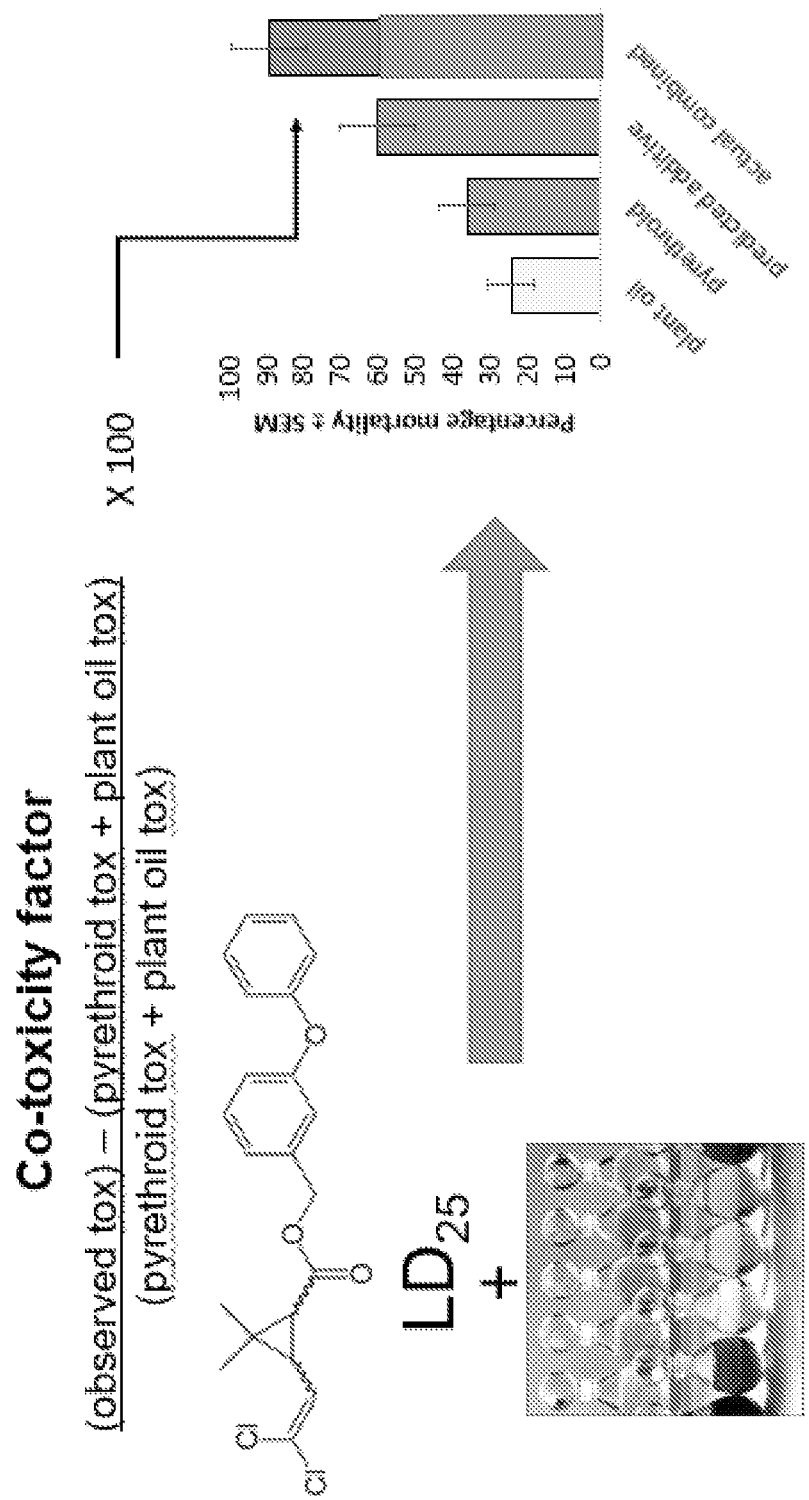
FIG. 3 illustrates aspects of the present disclosure.

A methodology for improving insecticide resistance according to the present disclosure is exemplified in FIG. 3. As shown in FIG. 3, the addition of an additive (with moderate insecticide action on its own) with insecticides (which can be naturally occurring, such as pyrethrins or synthetic derivatives thereof) can create an insecticide composition that leverages synergism between the two components to have an effect that is more than simply additive (more than the sum of its parts). Such action can be measured by calculated values such as a co-toxicity factor.

Figure 4:
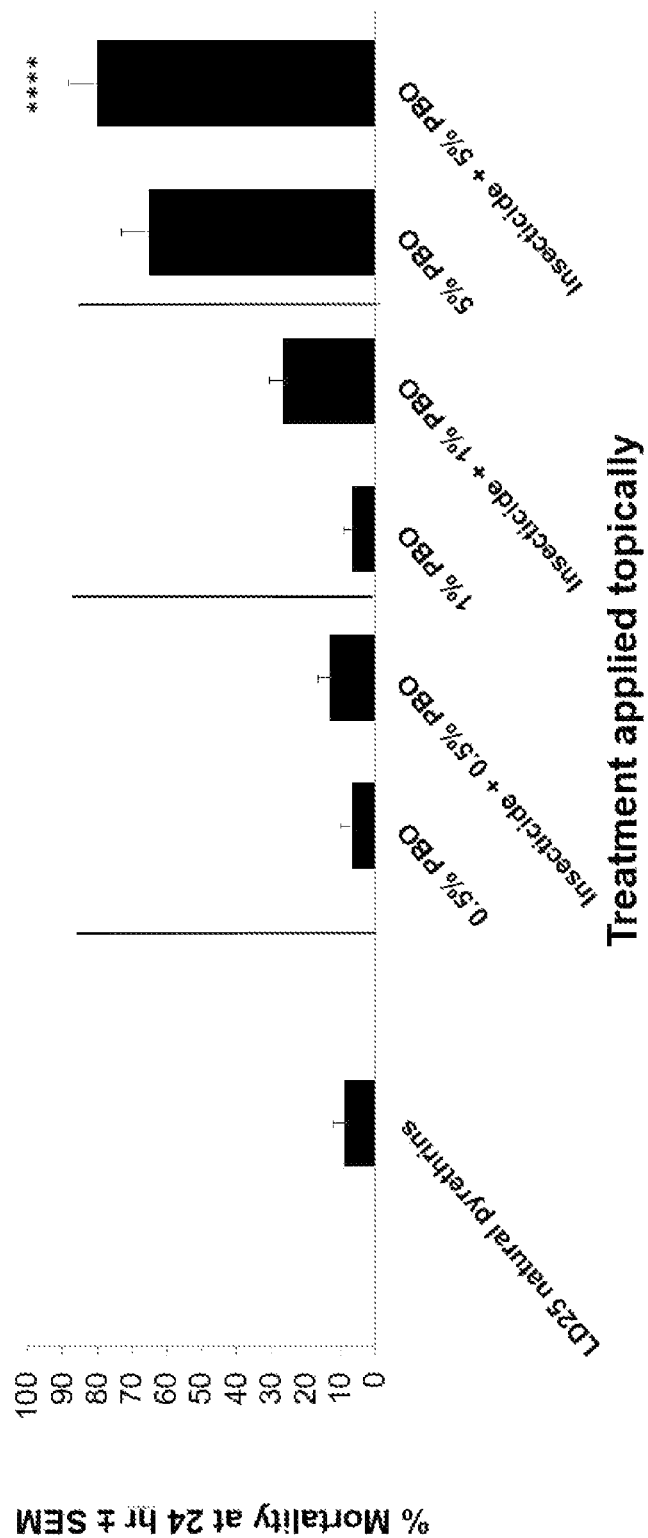
FIG. 4 is a graph showing synergism of insecticide (natural pyrethrins, NPs), PBO, and the combination thereof on mortality (24 hour) of *Aedes aegypti* mosquitoes. Mosquitoes were treated topically with 0.2 µL of different concentrations of insecticide+1% or 5% (w/v) piperonyl butoxide (PBO) in acetone. Mortality was recorded 24 hr after treatment.

An example of such synergism can be seen in FIG. 4. FIG. 4 is a graph showing synergism of insecticide (natural pyrethrins, NPs), piperonyl butoxide (PBO), and the combination thereof on mortality (24 hour) of *Aedes aegypti* mosquitoes. Mosquitoes were treated topically with 0.2 μL of different concentrations of insecticide+1% or 5% (w/v) piperonyl butoxide (PBO) in acetone. Mortality was recorded 24 hr after treatment.

Figure 5:
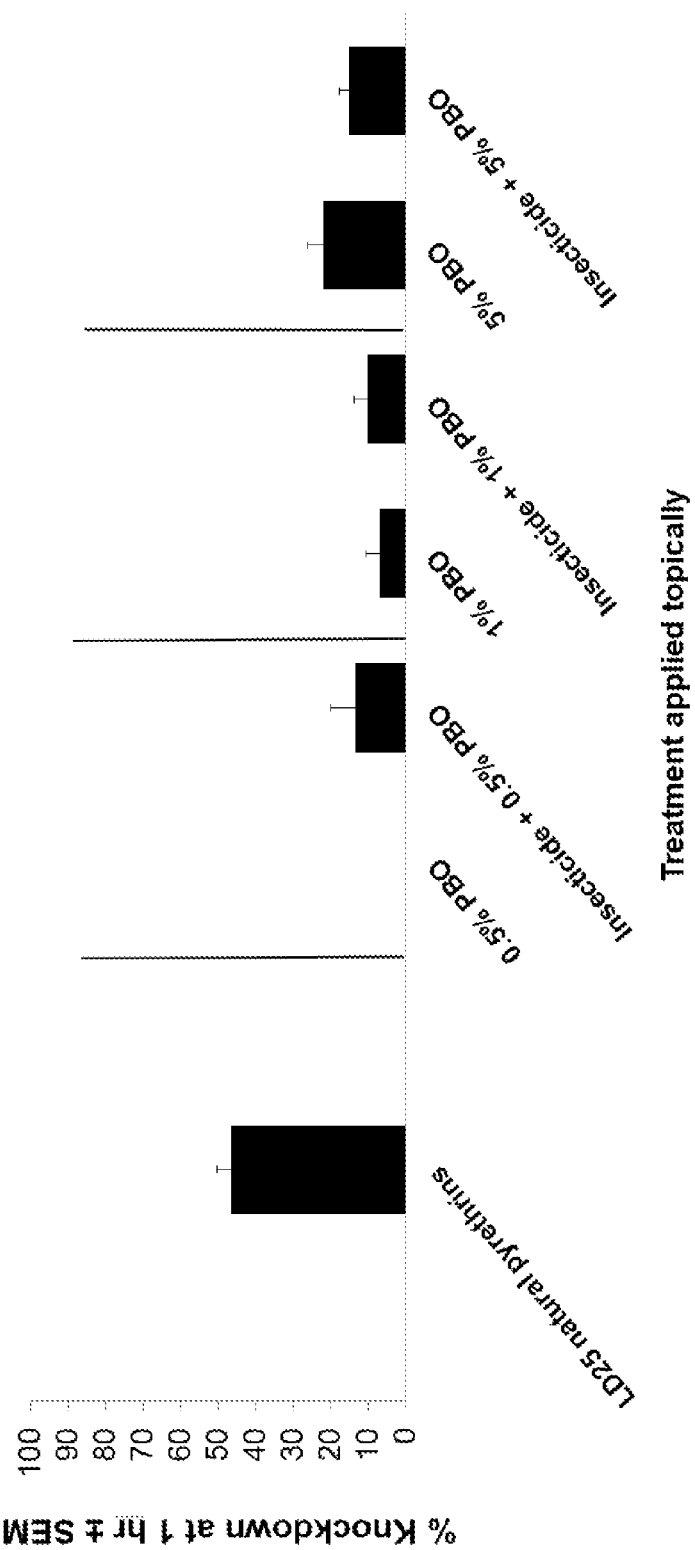
FIG. 5 is a graph showing antagonism of (natural pyrethrins, NPs), PBO, and the combination on knockdown (1 hour) of *Aedes aegypti* mosquitoes. Mosquitoes were treated with 0.2 µL different concentrations of insecticide+1% or 5% (w/v) PBO oil in acetone. Mortality was recorded 24 hr after exposure.
Figure 6:
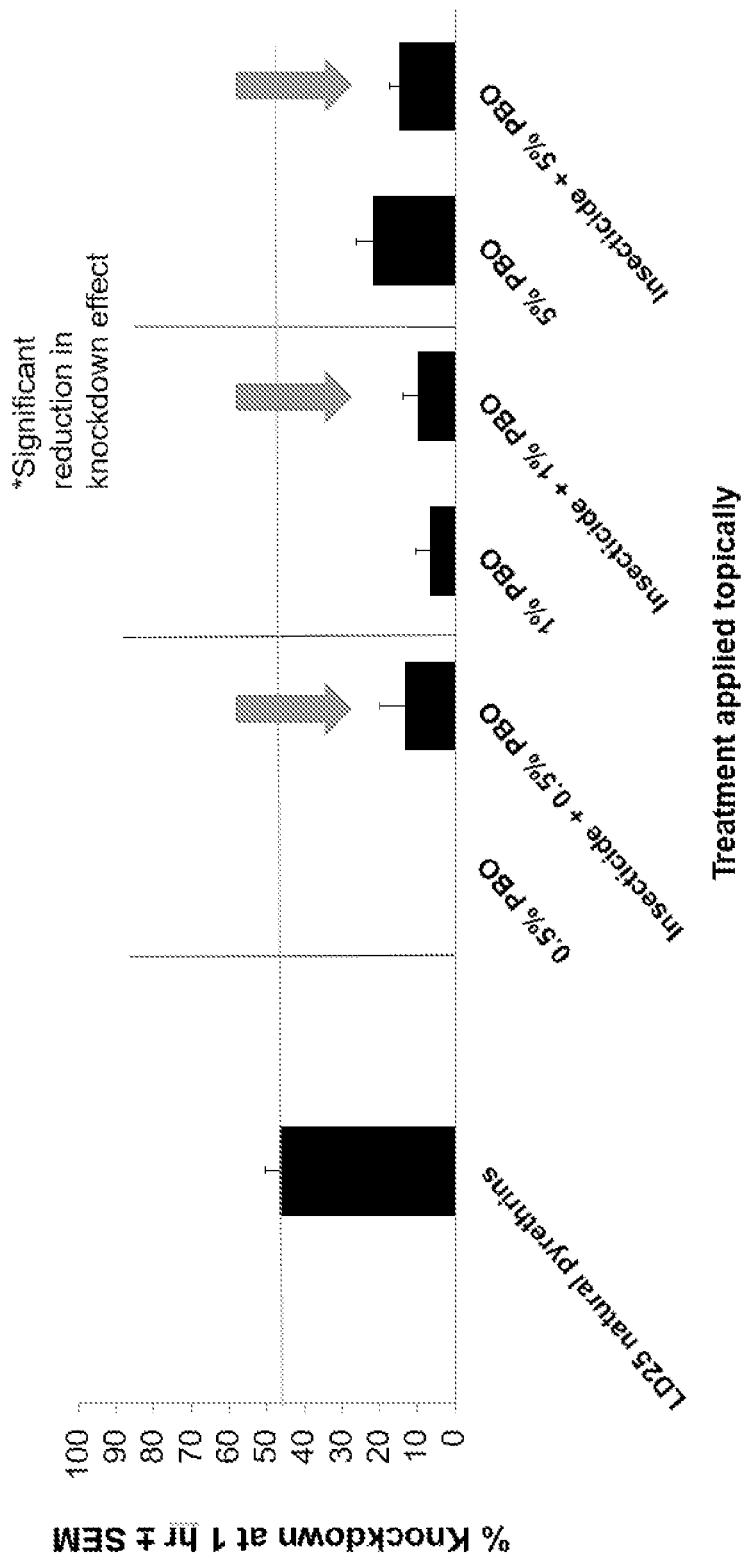
FIG. 6 is an annotated version of FIG. 5 with arrows denoting statistically significant reduction in knockdown effect.

Another example of such synergism is shown in FIG. 5, which is a graph showing antagonism of (natural pyrethrins, NPs), PBO, and the combination on knockdown (1 hour) of *Aedes aegypti* mosquitoes. Mosquitoes were treated with 0.2 μL different concentrations of insecticide+1% or 5% (w/v) PBO oil in acetone. Mortality was recorded 24 hr after exposure. FIG. 6 is an annotated version of FIG. 5 with arrows denoting statistically significant reduction in knockdown effect.

Figure 7:
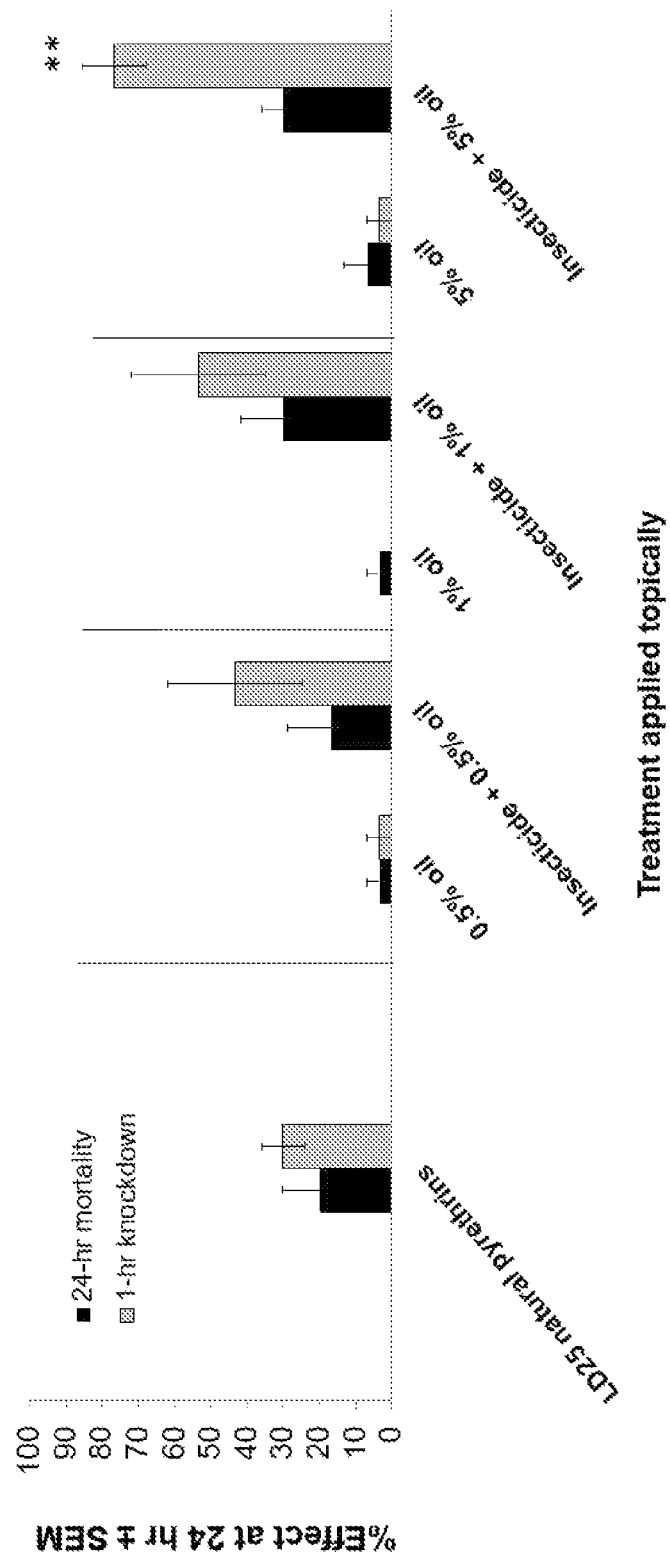
FIG. 7 is a graph showing synergism of (natural pyrethrins, NPs), fir needle oil, and the combination thereof on knockdown (1 hour) and mortality (24 hour) of *Aedes aegypti* mosquitoes. Mosquitoes were treated with 0.2 µL of different concentrations of insecticide+1% or 5% (w/v) fir needle oil in acetone. Mortality was recorded 24 hr after exposure.

Another example of such synergism is shown in FIG. 7. FIG. 7 is a graph showing synergism of (natural pyrethrins, NPs), fir needle oil, and the combination thereof on knockdown (1 hour) and mortality (24 hour) of *Aedes aegypti* mosquitoes. Mosquitoes were treated with 0.2 μL of different concentrations of insecticide+1% or 5% (w/v) fir needle oil in acetone. Mortality was recorded 24 hr after exposure.

As can be seen in certain aspects of the examples above, the use of compositions comprising an insecticide and an additive, such as an essential oil, can be synergistically efficacious, and have an effect that amounts to more than the sum of the parts of the composition.

Example 3

Synergism of Insecticidal Ingredients—Topically Applied

Aedes aegypti mosquitoes (susceptible Orlando strain and pyrethroid resistant Puerto Rico strain) were reared using standard protocols and provided by the United States Department of Agriculture—Center of Medical, Agricultural, and Veterinary Entomology (Gainesville, FL). Adult mosquitoes were anesthetized on ice, and the females treated with 0.2 µL of ethanolic solution using a repeating microapplicator (Hamilton Co., Reno, NV). Ten females were used per concentration and taken from at least three different emerged cohorts. Knockdown (defined as inability to fly or orient in the upright direction) was recorded at 1 hr or other time points post application (depending on the experiment), whereas mortality (defined as no movement—ataxia) was recorded at 24 hr. The dose that produced 50% knockdown ($KD_{50}$) was calculated, and those that produced 10-90% mortality at 24 hr post exposure were used to calculate the lethal dose required to kill 50% of the population ($LD_{50}$). Synergism studies were performed using the maximal sublethal dose of the fir needle oil in combination with varying concentrations of insecticide to calculate the $LD_{50}$ value of the insecticide in combination with the natural synergist. SAS 9.4 software was used to calculate the $LD_{50}$ values using a PROC PROBIT model with Abbott's correction to account for any control mortality. Synergist ratios were calculated as: $KD_{50}$ or $LD_{50}$ of compound alone÷$KD_{50}$ or $LD_{50}$ of compound+Fir needle oil.

Ethoxycoumarin De-ethylase Activity Assay

Ethoxycoumarin de-ethylase activity was measured according the methods of Anderson and Zhu (2004) with minor modifications. In short, mosquitoes were treated with 0.2 µL of fir needle oil or delta-carene 5% w/v solution in ethanol and incubated for 4 hr prior to sacrificing treated insects. Approximately 100 insects were homogenized in 0.1 PBS solution, and homogenates centrifuged at 10,000×g for 20 minutes at 4° C. The resulting supernatant containing microsomes was then used as the enzyme preparation for the remainder of the assay. In each well, 20 µL of enzyme preparation was added to a final volume of 100 µL 0.1 PBS containing 250 µM reduced β-NADPH and 2 mM ethoxycoumarin. After adding the enzyme solution to the wells, plates were incubated at room temperature for 3 hr. After 3 hr incubation, 10 µL of 3.2 mM of oxidized glutathione was added to each well and 1 U of yeast glutathione reductase was added to each well. Plates were then incubated at room temperature to oxidize the remaining β-NADPH not fully reduced in the reaction. Fluorescence values were then read at 390/465 nm excitation/absorbance.

Synergism of Insecticidal Block on the Mosquito Central Nervous System

Extracellular recordings were performed on the central nervous system of third-fourth-instar Aedes aegypti larvae. Mosquito larvae were pinned down and dissected to expose the descending ventral nerve cord in a saline bath (157 mM NaCl, 3 mM KCl, 2 mM $CaCl_2$), 4 mM HEPES). The ventral nerve cord was severed between the second and third abdominal ganglion using small forceps. Descending electrical activity was monitored by drawing emanating nerve fibers from the ventral nerve cord into a suction electrode connected to an AC/DC differential amplifier (Model 3000, A-M Systems, Inc., Carlsborg, WA, USA). Signals were subjected to window amplitude discrimination and converted into a rate plot, expressed in Hertz (Hz), using LabChart 7 Pro software (AD Instruments Inc. Colorado Springs, CO, USA). Noise (60 Hz) was reduced substantially using a Hum Bug instrument (A-M Systems, Sequim, WA, USA). Electrical activity was monitored for 5-10 min to establish a baseline CNS firing rate before test solutions were added to the bath. Compounds were dissolved in DMSO and 1 µL of solution was diluted into 999 µL of saline and mixed by gentle pipetting. All concentrations of active ingredients and synergists were expressed as their final concentrations in saline suspension. Each recording was performed for 30 min, and a new CNS preparation was used for each treatment and replicate. The CNS firing frequency was averaged over 1 min intervals, immediately prior to the application of the tested compound (baseline) and every 1 min after the application of test compound for 30 min. An unpaired t-test between individual treatments was performed to determine significant differences at discrete time points following treatment ($\alpha=0.05$). In certain aspects, statistically significant differences between the DMSO control and the 100 nM natural pyrethrins treatment were indicative of synergism directly on the nervous system.

Results

TABLE 2

24-hr $LD_{50}$ and 1-hr $KD_{50}$ values, along with synergist ratios (SR) for various insecticides alone and in combination with fir needle oil (FNO) after topical application to a pyrethroid-susceptible strain of Aedes aegypti (Orlando).

| Treatment | $LD_{50}$ ng/mg | $LD_{50}$ SR | $KD_{50}$ ng/mg | $KD_{50}$ SR |
|---|---|---|---|---|
| Clothianidin | 4.5 | | 22 | |
| +FNO 5% | 1.9 | 2.4 | 1.4 | 16 |
| Naled | 1.15 | | 1.05 | |
| +FNO 5% | 0.8 | 1.5 | 0.9 | 1.2 |
| Natural pyrethrins | 1.1 | | 0.38 | |
| +FNO 5% | 0.9 | 1.2 | 0.03 | 12.7 |
| Permethrin | 0.09 | | 0.06 | |
| +FNO 5% | 0.26 | 0.34 | 0.01 | 6 |
| Fipronil | 0.1 | | 10.7 | |
| +FNO 5% | 0.16 | 0.63 | 5.5 | 1.94 |
| Imidacloprid | 1.1 | | 3.7 | |
| +FNO 5% | 0.48 | 2.29 | 2.6 | 1.42 |
| Thiamethoxam | 3.4 | | 17.2 | |
| +FNO 5% | 0.99 | 3.4 | 0.72 | 23.9 |

TABLE 3

24-hr $LD_{50}$ and 1-hr $KD_{50}$ values for clothianidin and 5% w/v of one of two major components within fir needle oil (FNO), delta-carene and bornyl acetate, via topical application on a pyrethroid-susceptible strain Aedes aegypti (Orlando).

| Treatment | $KD_{50}$ | $KD_{50}$ SR | $LD_{50}$ | $LD_{50}$ SR |
|---|---|---|---|---|
| Clothianidin | 22 | | 4.5 | |
| +FNO 5% | 1.4 | 16 | 1.9 | 2.4 |
| +delta-3-carene 5% | 1.1 | 20 | 0.96 | 4.7 |
| +bornyl acetate 5% | 2.3 | 9.6 | 0.92 | 4.9 |

TABLE 4

24-hr $LD_{50}$ and 1-hr $KD_{50}$ values for various oils alone and in combination with fir needle oil (FNO) after topical application on a pyrethroid-resistant *Aedes aegypti* strain (Puerto Rico).

| Treatment | $KD_{50}$ | $KD_{50}$ SR | $LD_{50}$ | $LD_{50}$ SR |
|---|---|---|---|---|
| Imidacloprid | 10.7 | | 8.6 | |
| +FNO 5% | 3.4 | 3.1 | 3.3 | 2.6 |
| Natural pyrethrins | 4.2 | | 23 | |
| +FNO 5% | 9.2 | 0.5 | 11.2 | 2.1 |
| Clothianidin | 9.15 | | 1.5 | |
| +FNO 5% | 0.75 | 12.2 | 0.9 | 1.7 |

Figure 8:
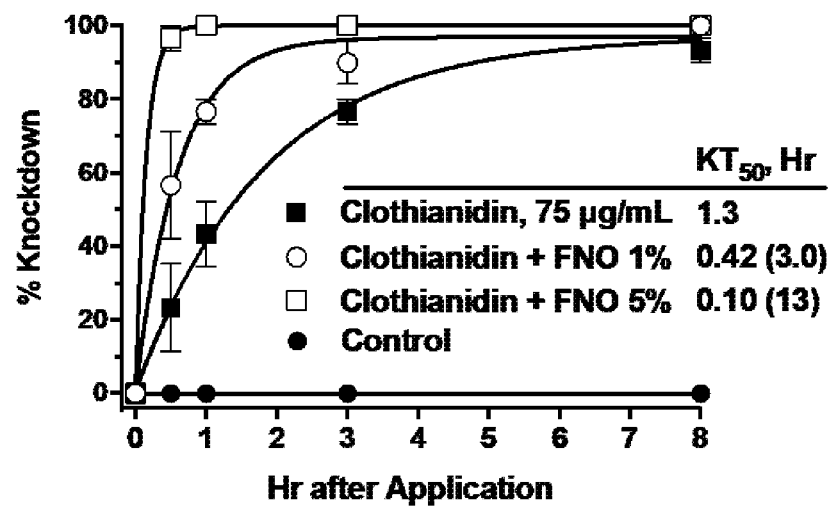
FIG. 8 is a graph showing time course of knockdown after application of clothianidin topically to the Orlando strain of *Aedes aegypti* females alone and in combination with fir needle oil (FNO). Symbols are means±SEM. If error bars are absent, it is because they are within the size of the symbol. Numbers in ( ) are $KT_{50}$ ratios: clothianidin÷clothianidin+FNO.
Figure 9:
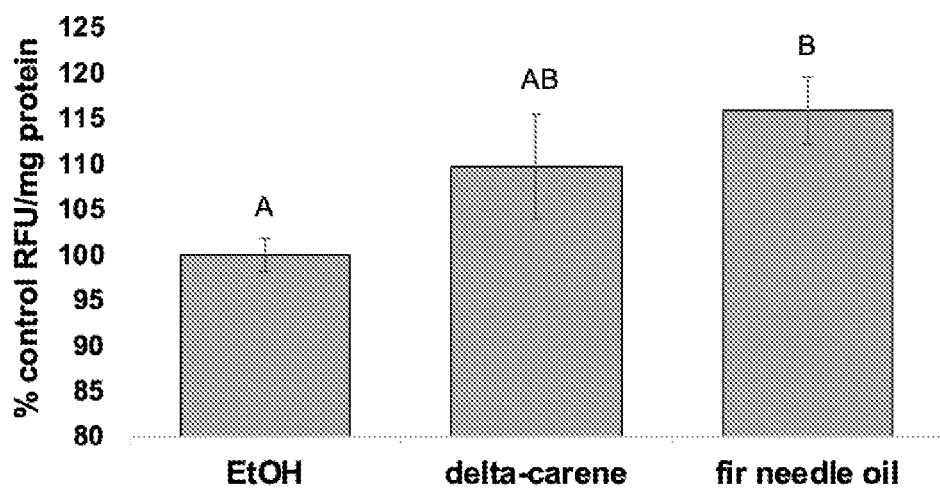
FIG. 9 is a graph showing ethoxycoumarin de-ethylase (cytochrome P450 mono-oxygenase) activity of mosquitoes treated topically with 0.2 µL of either ethanol (control), 5% (w/v) delta-carene, or fir needle oil. Mosquitoes were incubated for 4 hr prior to homogenization and enzyme screens. Mosquitoes treated with fir needle oil, but not delta-carene, showed significantly higher levels of ethoxycoumarin de-ethylase activity than vehicle-treated mosquitoes. Statistical analysis was by ANOVA with Tukey's posttest. Bars not labeled by the same letter are statistically significantly different (P<0.05). Thus, the high degree of KD synergism of fir needle oil is matched by delta-carene, which has improved LD synergism, presumable by not increasing P450 activity.

Given the strong synergistic effects on knockdown (FIG. 8), presumably an effect on penetration, the much-reduced synergism effect of fir needle oil on mortality (Table 2) was interesting. Fir needle oil may be inducing expression of cytochrome P450 mono-oxygenases. Accordingly, ethoxycoumarin de-ethylase (cytochrome P450 mono-oxygenase) activity was determined biochemically 4 hr after treatment to insects (FIG. 9).

Figure 10:
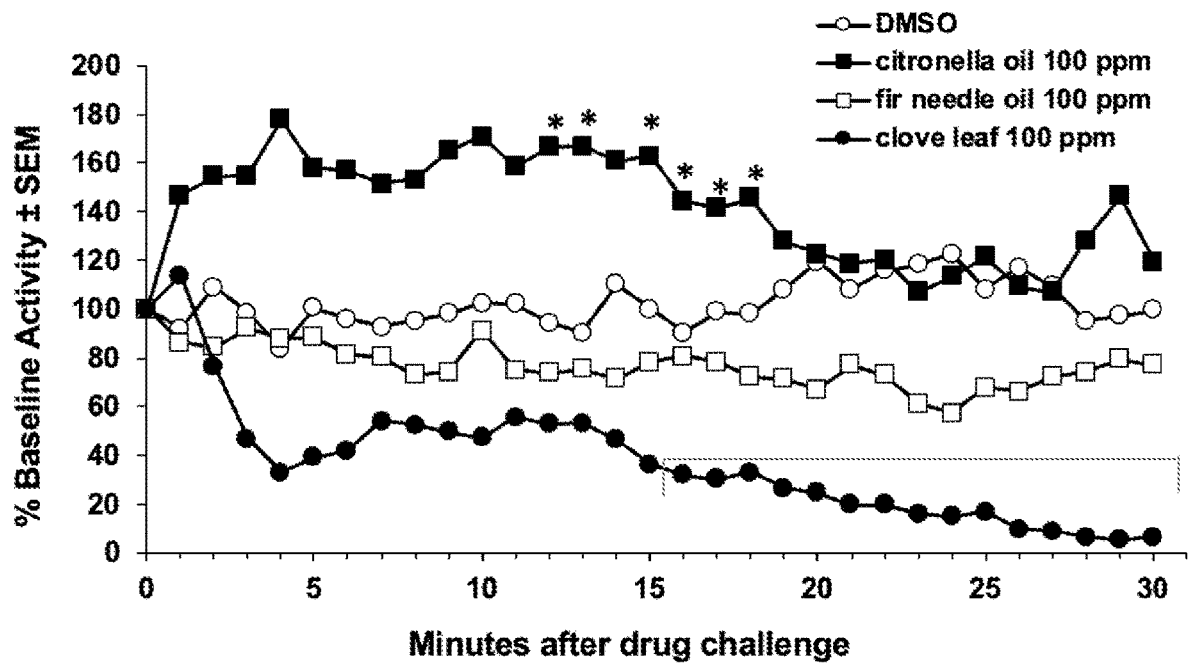
FIG. 10 is a graph showing central nervous system firing of $3^{rd}$-$4^{th}$ instar larvae of *Aedes aegypti* exposed to 100 ppm of various oils or vehicle (DMSO). Citronella oil and clove leaf oil produced significant (P<0.05) hyperexcitation (*) or blockage (blue bracket of inclusive time points), respectively. Symbols are means with error bars are omitted for clarity. Unlike citronella and clove leaf oils, fir needle oil neither elevated nor decreased nerve firing.
Figure 11:
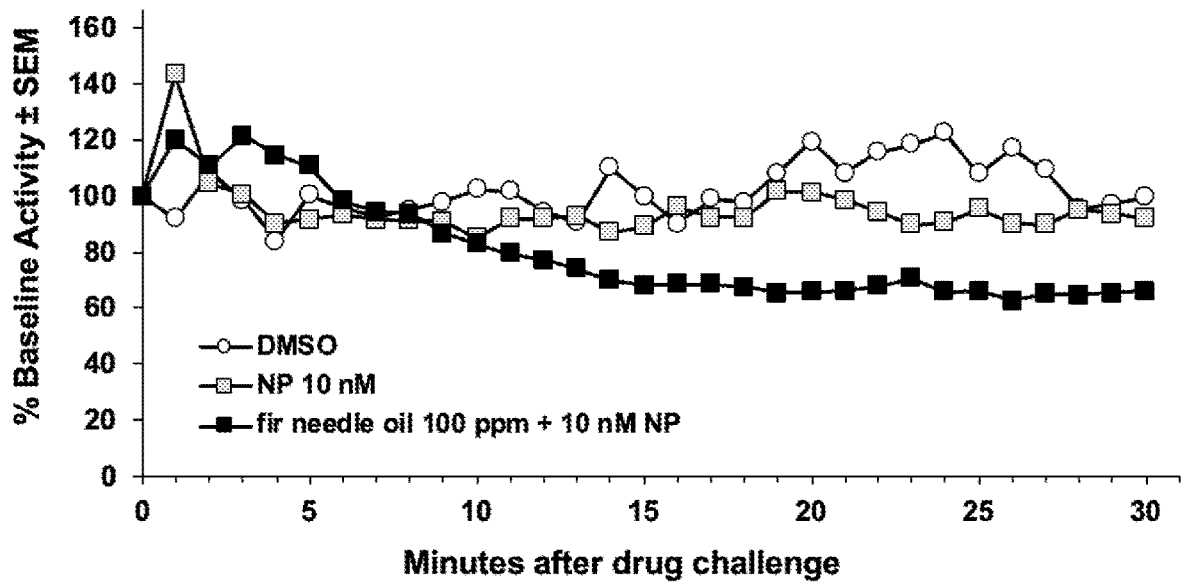
FIG. 11 is a graph showing central nervous system firing of $3^{rd}$-$4^{th}$ instar larvae of *Aedes aegypti* exposed to 100 ppm fir needle oil+10 nM natural pyrethrins (NP) or vehicle (DMSO). Symbols are means with standard error bars omitted for clarity. There was no significant amplification of NP effects at any time point by fir needle oil, suggesting that effects on the nervous system are not involved in the observed whole insect synergism.

Another potential mechanism of fir needle oil synergism would be an effect on the insect nervous system. Electrophysiological recordings were undertaken to investigate this aspect, comparing effect of fir needle oil to that of citronella and clove leaf oils (FIG. 10). Electrophysiological recordings were also undertaken comparing vehicle (DMSO), 10 nM natural pyrethrins (NP), or fir needle oil 100 ppm plus 10 nM NP (FIG. 11).

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range ±10%. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. An insecticide composition, comprising:
   about 1% to about 10% (w/v) of fir needle oil; and
   an insecticide, wherein the insecticide is from the neonicotinoid class of insecticides in an amount of 3.4 to 22 ng/mg body weight of an *Aedes* aegytpti mosquito.

2. The insecticide composition of claim 1, further comprising a carrier.

3. The insecticide composition of claim 1, wherein the insecticide is clothianidin.

4. The insecticide composition of claim 1, wherein the insecticide is imidacloprid or thiamethoxam.

5. The insecticide composition of claim 1, further comprising piperonyl butoxide (PBO).

6. The insecticide composition of claim 1, wherein the fir needle oil is in amount of about 5% (w/v).

7. An anti-*Aedes* aegytpti insecticide composition, comprising:
   about 5% (w/v) of fir needle oil; and
   an insecticide, wherein the insecticide is a neonicotinoid at a concentration of 75 µg/mL.

8. The insecticide composition of claim 7, wherein the neonicotinoid is clothianidin.

9. The insecticide composition of claim 7, further comprising piperonyl butoxide (PBO).

10. The insecticide composition of claim 7, further comprising a carrier.

* * * * *